April 28, 1964

D. J. SANTELER ETAL 3,131,396

CRYOGENIC PUMPING APPARATUS

Filed Sept. 30, 1960

INVENTORS
DONALD J. SANTELER
FRANKLIN C. HURLBUT by Paul A. Frank

His Attorney.

April 28, 1964   D. J. SANTELER ETAL   3,131,396
CRYOGENIC PUMPING APPARATUS
Filed Sept. 30, 1960   2 Sheets-Sheet 2

INVENTORS
DONALD J. SANTELER
FRANKLIN C. HURLBUT
by Paul A. Frank
His Attorney.

3,131,396
CRYOGENIC PUMPING APPARATUS
Donald J. Santeler, Scotia, N.Y., and Franklin C. Hurlbut, Berkeley, Calif., assignors to General Electric Company, a corporation of New York
Filed Sept. 30, 1960, Ser. No. 59,642
13 Claims. (Cl. 62—404)

The present invention relates to cryogenic pumping apparatus and, more particularly, to cryogenic apparatus for use in space simulating chambers.

With the impetus toward the successful launching of vehicles into space, there is indicated a need for extensive testing of vehicles or components thereof under conditions substantially duplicating the spatial environment. Studies performed indicate that this simulated environment should include the following conditions: Solar radiation, cold "black" space, the pressure of outer space, earth albedo and infrared radiation inputs to the vehicle.

The more severe conditions of simulating the spatial environment are creating the cold "black" space and the extremely low pressure conditions, these two conditions being substantially related. In space, gas molecules leave a vehicle in a cosine distribution away from the surfaces thereof. Only occasionally will one of these molecules collide with another molecule and be returned to the vehicle. The characteristic that a molecule leaving a space vehicle will have a low probability of being returned to the vehicle is also defined in terms of pumping speed; i.e., the higher the pumping speed, the lower the probability that a molecule will return to the space vehicle. To duplicate this effect in a confining chamber, it is necessary to have an almost perfect absorbing wall which substantially traps every molecule reaching it.

In simulating cold "black" space, it is necessary to cool a large portion of the chamber wall to a relatively cold temperature. This temperature preferably is less than approximately 100° K. (Kelvin).

In order to simulate spatial pressure conditions, it has been suggested that a three-fold pumping arrangement be utilized which includes mechanical pumping, diffusion pumping, and cryogenic pumping. The first two methods of pumping achieve substantial removal of gaseous material from the chamber; cryogenic pumping effects the condensation of remaining gases on surfaces within the chamber. Cryogenic pumping may be performed by refrigerating surfaces in the simulating chamber. If a surface is cooled with liquid nitrogen at 77° K., it cryogenically pumps water, carbon dioxide, and hydrocarbons. This corresponds only to a small percent of the total gases which may be present in the chamber. A liquid hydrogen temperature wall at approximately 20° K. condenses and cryogenically pumps nitrogen, oxygen, argon, carbon monoxide, and leaves only helium, hydrogen, and neon as unpumped gases. If liquid helium gas at approximately 4° K. is used, only the helium in the chamber will not be condensed. Helium represents only four parts per million of the earth's atmosphere. Unfortunately, enclosing the entire simulating chamber with a helium cooled surface may not be economically feasible.

It has been found that the heat losses to the refrigerated walls of a simulated chamber are predominantly due to radiant energy. The use of helium as a refrigerant to cool surfaces to accommodate this heat load and to perform cryogenic pumping is wasteful since nitrogen cooled systems are extremely effective in performing the energy absorbing function. The present invention envisions segregating the radiant energy load from the cryogenic pumping load to achieve an effective space simulator.

The chief object of the present invention is to provide an improved space simulating chamber.

Another object of the invention is to provide an improved cryogenic pumping means.

A still further object is to provide an improved cryogenic member for use in a space simulator.

These and other objects of our invention may be more readily perceived from the following description.

Briefly stated, the present invention relates to a space simulator including a substantially evacuated chamber with means for absorbing radiant energy and means for condensing gases located therein, gas molecules in the chamber being reflected toward the means for condensing gases which is substantially shielded from radiant energy. The term "condensing" as utilized herein denotes the substantial condensation of certain gases on the condensing means, those gases that do not condense on the radiant energy absorbing means because of their low boiling points.

The attached drawings illustrate preferred embodiments of the invention, in which:

FIGURE 1 is a view in section of a space simulator chamber employing the present invention;

Figure 3:
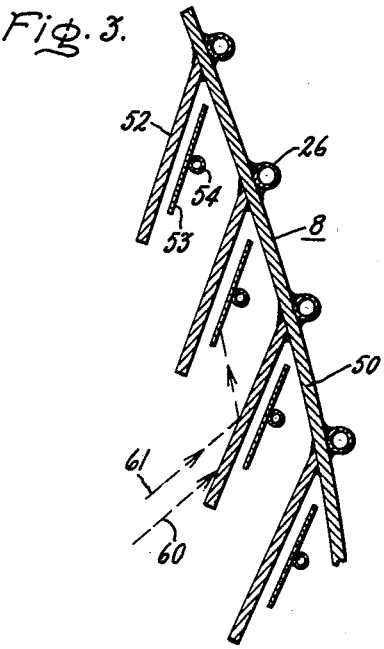
FIGURE 3 is a sectional view of a cryogenic member which may be utilized in the apparatus shown in FIGURE 1.

In FIGURE 1 there is shown a space simulator 2 which comprises an outer insulated housing including an upper hemispherical shell 3, a lower hemispherical shell 4 and a central cylindrical shell 5 which defines the evacuated chamber within which a test member 12 is to be tested. Shield 6 located within the chamber is intended to absorb radiant energy. A suitable solar radiation source 7 is also located in the upper portion of the chamber. A substantially spherical cryogenic member 8 is mounted in the lower portion of the chamber. Shield 6 is supported by a plurality of gusset plates 10, spherical member 8 being supported by rods 11 extending from gusset plates 10.

As initially noted, evacuation of chamber 2 may be achieved by the combination of mechanical, diffusion, and cryogenic pumping means. The mechanical and diffusion pumping means are located externally of simulator chamber 2 and are connected thereto by means of conduit elbows 17 and 18. Elbows 17 and 18 extend through cylindrical portion 5 of the housing and one end of each extends through radiant energy absorbing shield 6. The opposite ends of the elbows are connected to suitable diffusion pumps 20 and 21 which are further connected to mechanical pumping means 22 and 23. The construction and manner of operation of diffusion pumps 20 and 21 are described more fully hereinafter.

The upper portion of chamber 2 has located therein the previously noted radiant energy absorbing shield 6 which comprises a frusto-conical shape portion 14 and a cylindrical portion 16. These portions are fabricated of plate material and suitably connected to form a structure which envelops the light source 7 and a portion of the substantially spherical cryogenic pumping member 8. Suitable heat exchange coils 15 are fastened and thermally connected to the plates comprising shield 6. A refrigerant, such as liquid nitrogen, may be expanded or evaporated in coils 15. As previously noted, it is desired that a temperature less than approximately 100° K. be maintained within the space simulating chamber. This is readily achieved by the use of liquid nitrogen which may provided an evaporating temperature of approximately 77° K. so that shield 6 will be within the temperature range of from 77° K. to approximately 100° K. The function of the radiant energy absorbing shield 6 is to absorb photons in a manner that no randomly reflected energy in any uncontrolled manner passes into the lower portion of the chamber. For this reason, the plates are preferably fabricated or plated with aluminum and anodized a deep black and thus have high absorptivity. Gaseous molecules located in the upper portion of the chamber condense on the surface of shield 6 and then re-evaporate and in effect are reflected to other surfaces within the chamber.

Cryogenic pumping member 8 comprises a plurality of panels 25 which are fabricated to form a substantially spherical enclosure having an opening through which the radiant energy from the light source 7 may pass. A test member 12 may be mounted in the center portion, or test station, of the cavity substantially defined by cryogenic pumping member 8. Cryogenic pumping member 8 is provided with suitable refrigerant coils 26 through which a suitable gas such as nitrogen is passed. The nature of the inner surface of cryogenic pumping member 8 is described more fully hereinafter.

Figure 2:
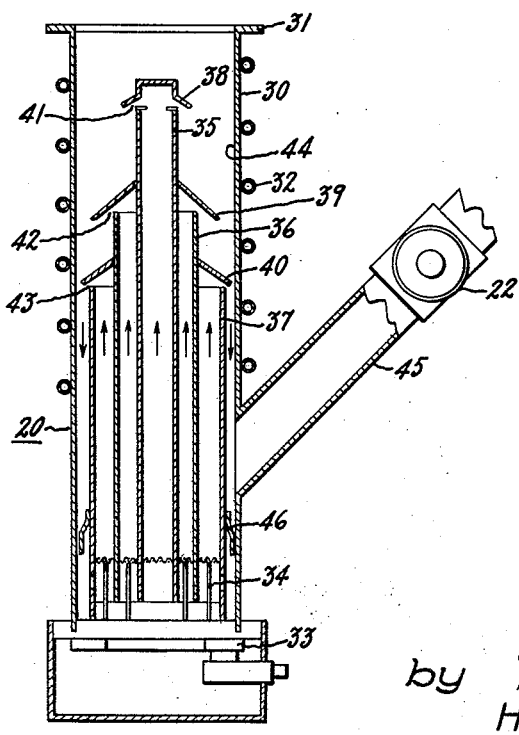
FIGURE 2 is a sectional view of a diffusion pump utilized in the apparatus shown in FIGURE 1.

A sectional view of diffusion pump 20 is illustrated in FIGURE 2. Diffusion pump 20 comprises a cylindrical casing 30 having a connecting flange 31 adapted to be suitably connected to the space simulating chamber. Cylindrical casing 30 is in heat exchange relation with coil 32 through which coolant is passed for the purpose of cooling inner surface 44 thereof. In the lower portion of the pump suitable heating means 33, such as an electric heater, may be provided which is associated with a boiler 34 in which an organic oil or pumping fluid is purified by crude fractionation. The oil vapor from the boiler passes upwardly through three concentric annular passages defined by cylindrical members 35, 36, and 37. The ends of the cylindrical members cooperate with suitable deflectors 38, 39, and 40 to define annular orifices 41, 42, and 43. These orifices direct the oil vapor annularly toward cooled surface 44.

The action of the pump depends on the myriad individual collisions of oil-vapor molecules with molecules of air or other gas being pumped. Jets of oil-vapor molecules are emitted from orifices 41, 42, and 43, at velocities approximating the speed of sound. The jets are shaped to make the emitted oil vapor thrust strongly downward and outward. Air molecules traveling in a comparatively random fashion enter the region occupied by the jets and suffer collisions with the much heavier oil molecules. The driving rain of oil molecules propel the air generally downward, thus compressing it. The three orifices define three stages of compression. In the lower portion of the pump, the oil is returned to the boiler as a film while the highly compressed gas is passed through a foreline 45 connected to a suitable mechanical pump 22 which discharges the gas from the system. Deflector 46 acts as a check valve to maintain the fluid flow pattern in the pump. The oil returning to the boiler is again vaporized and passed through the previously mentioned orifices to further compress the gas thereby substantially evacuating the chamber. A pressure of $1 \times 10^{-5}$ mm. of mercury may be readily achieved by such a diffusion pump.

In FIGURE 3, there is shown an enlarged sectional view of a portion of cryogenic pumping member 8. This member comprises a spherical wall or panel portion 50 which is associated with heat exchange coil 26 also shown in FIGURE 1. Coil 26 is soldered or thermally attached in another conventional manner to wall 50 so that the expanding gas within the tube is in heat exchange relation with said wall. A plurality of baffle fins 52 extend angularly from or at an oblique angle to wall 50 and are thermally connected to wall 50. In this manner, the temperature of the wall and baffle fins are substantially that of coils 26 through which refrigerant is circulated.

As previously noted, the major portion of the heat load in the apparatus is due to radiant heat which may be partially absorbed by radiant energy absorbing shield 6 located in the upper portion of the apparatus shown in FIGURE 1. The remaining energy which is reflected or emitted from the test member in FIGURE 1 is substantially absorbed by baffle fins 52 shown in FIGURE 3. The high absorbent qualities of the black anodized surface of the panels which comprise cryogenic pumping member 8 and radiant energy absorbing shield 6 constitute a heat sink for radiant energy and for the heat of condensation of molecules condensing thereon and thus simulate the radiation absorption and high pumping speeds of cold black space.

It has been found that to simulate space, a pressure less than approximately $1 \times 10^{-5}$ mm. of mercury is desirable. With the present invention, a pressure of $1 \times 10^{-9}$ mm. of mercury may be achieved in the chamber. This capacity is necessary to maintain desired pressure while the test member is being outgassed. A substantially low pressure may be achieved by the use of mechanical and diffusion pumps. However, the present invention envisions combining therewith cryogenic pumping of certain gases. Cryogenic pumping in the present invention may cause the condensation of molecules of gases having boiling points less than approximately 77° K. including nitrogen, oxygen, argon, and possibly neon and hydrogen within the chamber on suitable surfaces provided therein in order to achieve the desired low pressure.

The present invention overcomes the disadvantage normally associated with cryogenic pumping wherein the extremely low temperatures needed and provided by refrigerants such as helium and hydrogen are wasted on the major portion of the heat load which is the absorption of radiant energy. This is achieved by providing baffle fins 52 on the surface of which radiant energy is readily absorbed and at the same time the surfaces for cryogenic pumping are concealed and associated with suitable means which will deflect the gas molecules toward these hidden surfaces so that the molecules may be condensed. In FIGURE 3, radiant energy in the form of photons encounter the exposed surfaces of baffle fins 52 and is absorbed by the low temperature black surfaces presented. In the case of gas molecules, the random movement of these molecules is such that the molecules also encounter the baffle fin surfaces upon which the gas condenses and then re-evaporates in accordance with the cosine law. In effect, this is a reflection and the molecules rebound from the reflecting surface and are directed toward condensing fin 53 which is thermally insulated from baffle fin 52 and wall 50. As previously noted, baffle fin 52 may be maintained at a temperature of approximately 77° K. through the use of nitrogen gas which is evaporated. Condensing fin 53 may be maintained at a lower temperature, in the range of, for example, 20° K. by having associated therewith a heat exchange tube 54 through which low temperature helium gas may be passed. By this means, the radiant energy heat load is readily accommodated by the higher temperature nitrogen refrigerant circuit while the cryogenic pumping of nitrogen, oxygen, argon, and carbon monoxide may be performed by the lower temperature and more expensive helium refrigerant circuit.

Figure 4:
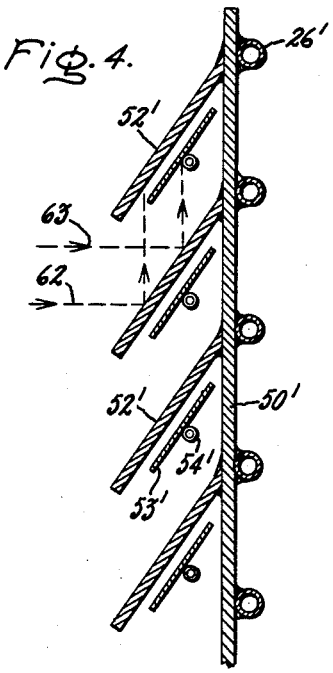
FIGURE 4 is a sectional view of another embodiment of the member illustrated in FIGURE 3.

FIGURE 4 shows another embodiment of the invention in which the cryogenic pumping member may have a flat planar wall 50' with baffle fins 52' and condensing fins 53'. The condensing and reflecting fins are at an angle of approximately 45° with the wall 50' in a manner similar to fins 52' and 53' in FIGURE 3 which are at an angle with a tangent to wall 50. By this orientation of elements, the condensing or cryogenic pumping portions of the device are concealed or shielded from sources of radiant energy in such a manner that the larger portion of the heat load is in direct communication with and absorbed by the baffle fins. The pumping surfaces are utilized for condensing gases with little opportunity for radiant energy to reach these surfaces.

In operation of the present invention, a test member 12 is suitably suspended in simulator chamber 2, illustrated in FIGURE 1. The access openings which are provided are suitably sealed; mechanical pumping and diffusion pumping is initiated. As previously noted, the diffusion pumps are three-stage arrangements where the oil vapor molecules are emitted from suitable jets at speeds approximating that of sound the jets are directed so that the emitted oil vapors are thrust strongly downward and outward, trapping air molecules which are discharged through the line 45 while condensed oil is passed downwardly and returned to boiler 34 wherein the oil is again heated and recirculated. The compressed gases pass through line 45 to mechanical pump 22 and are discharged from the system. The function of the mechanical and diffusion pumps is to reduce substantially the pressure in the chamber and thereby simulate the pressure conditions existing in outer space. It is also necessary to simulate temperature conditions and this function is performed by the previously mentioned surfaces maintained below a temperature of 100° K. In the apparatus illustrated in FIGURE 1, temperature is maintained by the panels comprising radiant energy absorbing shield 6 and cryogenic member 8 which constitute a heat sink through which liquid nitrogen may be circulated to maintain them within the temperature range of from approximately 77° K. to 100° K.

In simulating outer space, chamber 2 is provided with a suitable solar radiation means 7 which directs radiant energy toward test member 12, test member 12 being substantially enveloped by cryogenic pumping member 8. As previously noted, the test member may reflect radiant energy and discharge gas molecules. These photons and gas molecules pass through the simulator chamber in straight line paths. Photons which pass outwardly from the test member are substantially absorbed by the nitrogen cooled panels of shield 6 and member 8 which together constitute a heat sink. Molecules which are passed outwardly condense on these surfaces and in part re-evaporate.

Cryogenic pumping member 8 supplements the pumping efforts of the mechanical and diffusion pumping means previously described. In the preferred embodiment, liquid nitrogen gas is circulated through coils 26 of cryogenic member 8 to maintain the temperature of wall 50 and also the thermally attached baffle fins 52 less than approximately 100° K. Radiant energy is absorbed by the baffle fin construction and this is accompanied by the evaporation and subsequent reflection of the gas molecules from the surfaces. The baffle fins also optically shield the condensing fins and reflect the gas molecules toward the condensing means. In this manner, a low temperature refrigerant performs a cryogenic pumping function in a selective manner without encountering a major portion of a heat load in the simulator chamber. In FIGURE 3, the movement of a typical photon is shown by path 60. Reflected gas molecules follow path 61 and are trapped on the surface of condensing fin 53 which is cooled by hydrogen or helium and maintained at a temperature of approximately 20° K. or less if desired.

In FIGURE 4 there is shown another embodiment of cryogenic pumping construction wherein the wall member 50' is planar rather than spherical in shape as shown in FIGURE 3. In FIGURE 4, paths 62 and 63 illustrate the movement of gas molecules which are subsequently condensed on the condensing fin 53'.

In the present invention, the major portion of the heat load encountered in a space simulator is accommodated by use of comparatively higher temperature panels in such a manner that these panels provide not only a shielding function and an energy absorbing function but also a reflecting function so that gas molecules are directed toward a condensing surface at a lower temperature. The condensing surface is substantially confined to a cryogenic pumping operation for gases which condense at a temperature less than the energy absorbing surface temperature.

While we have described preferred embodiments of our invention, it will be understood that our invention is not limited thereto since it may be otherwise embodied within the scope of the appended claims.

What we claim as new and desire to secure by Letters Patent of the United States is:

1. In a space simulator, means defining a chamber, at least one pump connected to and adapted to substantially evacuate said chamber, a substantially spherical cryogenic member being located in said chamber and being adapted to substantially envelop a test member in said chamber, said cryogenic member comprising a wall member, a plurality of baffle fins extending from said wall member and being angularly disposed with respect to said wall member, said wall member and baffle fins being thermally connected, a plurality of condensing fins being located between the baffle fins and the wall member whereby the condensing fins are substantially shielded from the test member, and means for maintaining the condensing fins at a temperature substantially less than the temperature of the wall member.

2. A cryogenic member comprising a wall member, a plurality of baffle fins thermally connected to said wall member and being disposed at an oblique angle with respect thereto, a condensing fin located between a baffle fin and the wall member whereby the condensing fin is substantially shielded, said condensing fin being adapted to be maintained at a temperature substantially less than the temperature of the baffle.

3. A cryogenic member comprising a wall member, a baffle fin thermally connected to said wall member and being disposed at an oblique angle with respect thereto, a condensing fin located between the baffle fin and the wall member whereby the condensing fin is substantially shielded, said condensing fin being adapted to be maintained at a temperature substantially less than the temperature of the baffle fin, said wall member having a substantially spherical shape.

4. In a space simulator the combination of means defining a chamber, pump means located externally of the chamber and adapted to evacuate it, a heat sink having wall portions and baffle fins, said heat sink being mounted within the chamber, thermally insulated from the means defining the chamber and substantially enclosing a portion of the chamber, means for cooling the heat sink to within a first temperature range, said baffle fins being connected to a wall portion of the heat sink at an oblique angle with respect to the wall portion at the place of connection, said baffle fins adapted to be maintained substantially within said first temperature range, condensing fins, each condensing fin being associated with a baffle fin and being mounted adjacent its associated baffle fin in the space between its associated baffle fin and the wall portion, said condensing fins being thermally insulated from their associated baffle fins and the wall portion of the heat sink, the baffle fins substantially shielding their associated condensing fin from radiation originating within the portion of the chamber enclosed by the heat sink; the baffle fin next adjacent a condensing fin having a high probability of directing toward the condensing fin molecules of gas incident upon it and not condensible at the temperature of the baffle fin, and means for cooling the condensing fins to within a temperature range lower than said first temperature range.

5. In a space simulator the combination of means defining a chamber; pump means located externally of the chamber and adapted to evacuate the chamber; a heat sink mounted within the chamber, thermally insulated from the means defining the chamber, and substantially enclosing a portion of the chamber; said heat sink being comprised of a wall portion and baffle fins; said baffle fins being connected to said wall portion at an oblique angle with respect to the wall portion at the place of connection; means for cooling the heat sink to within a first temperature range; a condensing fin associated with a baffle fin; said condensing fin being mounted adjacent its associated baffle fin in the area between its associated baffle fin and a wall portion of the heat sink and being thermally insulated from both; the baffle fin with which a condensing fin is associated substantially shielding its associated condensing fin from radiation originating within the enclosed portion of the chamber; the baffle fin next adjacent a condensing fin having a high probability of directing toward said condensing fin molecules of gas incident upon it and not condensible at the temperature of the baffle fin; and means for cooling the condensing fin to within a temperature range lower than said first temperature range.

6. Means for simulating cold black space in a simulator having walls defining a chamber; pump means for evacuating said chamber; a part of the interior of the chamber defining a test station: said means for simulating cold black space comprising a heat sink mounted within the chamber and thermally insulated from the walls defining the chamber; said heat sink being comprised of a shield and cryogenic member; said heat sink substantially enclosing said test station; means for maintaining the heat sink substantially within a temperature range of from 77° K. to 100° K.; said cryogenic member having baffle fins connected at an oblique angle thereto; said baffle fins being substantially equally spaced from one another and being connected to the cryogenic member so as to have a temperature substantially equal to that of the heat sink; the portion of the heat sink including said baffle fins facing the test station being absorbent to radiant energy; condensing fins, a condensing fin being associated with a baffle fin; each condensing fin being mounted between its associated baffle fin and the cryogenic member so that each condensing fin is substantially shielded by the baffle fin with which it is associated from radiation originating with the test station and so that gas molecules, which strike a baffle fin adjacent a condensing fin and which are not condensible at the temperature of a baffle fin, have a high probability of being directed from the surface of said baffle fin toward the adjacent condensing fin; and means for maintaining the condensing fins at a temperature of approximately 20° K.

7. In a space simulator having wall means defining a chamber adapted to be evacuated and a portion of the interior of said chamber defining a test station, the improvements comprising: a heat sink, having wall portions, substantially enclosing said test station; first heat exchange conduit means for the heat sink through which a refrigerant is adapted to be circulated to cool the heat sink to within a first temperature range; substantially planar baffle fins, each baffle fin being connected to a wall portion of the heat sink at substantially an angle of 45° and cooled by said first heat exchange conduit means to within substantially the first temperature range; substantially planar condensing fins, each condensing fin being associated with a baffle fin, being mounted between its associated baffle fin and a wall portion of the heat sink substantially parallel to its associated baffle fin, and being thermally insulated from its associated baffle fin and the wall portion; heat exchange conduit means for the condensing fins through which a refrigerant is adapted to be circulated for cooling the condensing fins to within a second temperature range lower than said first temperature range; each of said baffle fins substantially shielding its associated condensing fin from radiation originating within the test station, the arrangement of the baffle fins and condensing fins being such that molecules of gases which strike a baffle fin and do not condense on the baffle fin have a high probability of being directed toward an adjacent condensing fin.

8. A cryogenic member comprising a wall portion; a plurality of baffle fins thermally connected to one side of said wall portion and being disposed obliquely with respect thereto, said baffle fins being substantially parallel to one another and substantially equidistantly spaced from one another; a plurality of condensing fins, each condensing fin being associated with a baffle fin and mounted between its associated baffle fin and the wall member in close proximity to the baffle fin, the baffle fins shielding their associated condensing fins from radiation substantially normal to said one side of said wall member; heat exchange conduit means connected to the wall portion through which a coolant is adapted to flow to cool the wall portion and the baffle fins to within one temperature range; heat exchange conduit means connected to the condensing fins through which a coolant is adapted to the flow to cool the condensing fins to within a second temperature range substantially lower than said first temperature range; said baffle fins and condensing fins being so arranged that a molecule striking a baffle fin adjacent a condensing fin and not condensing thereon has a high probability of being directed toward said condensing fin.

9. A cyrogenic member comprising a wall member, a plurality of baffle fins thermally connected to one side of said wall member and being disposed obliquely with respect thereto, said baffle fins being substantially parallel to one another and substantially equidistantly spaced from one another, a condensing fin associated with a baffle fin, said condensing fin being mounted between its associated baffle fin and the wall member in close proximity to its associated baffle fin, said baffle fin shielding its associated condensing fin from radiation substantially normal to said one side of said wall member, and heat exchange conduit means adapted for circulating a refrigerant therethrough and for cooling the wall member and the baffle fins, heat exchange conduit means adapted for circulating a refrigerant therethrough and for cooling the condensing fin to a temperature lower than said baffle fins, said baffle fins and condensing fin being so arranged that a molecule striking a baffle fin adjacent the condensing fin but not associated with the condensing fin, and not condensing on the baffle fin, has a high probability of being directed toward said condensing fin.

10. A cryogenic member comprising a wall member, a plurality of substantially planar baffle fins connected to said wall member and obliquely disposed with respect thereto, heat exchange conduits connected to the wall member through which a refrigerant is adapted to be circulated for cooling the wall member and the baffle fins to within a first temperature range, a substantially planar condensing fin associated with each said baffle fin, being mounted in close proximity with its associated baffle fin, each condensing fin being located between its associated baffle fin and the wall member substantially parallel to the baffle fin and thermally insulated therefrom, heat exchange conduit means for the condensing fins through which a refrigerant is adapted to be circulated for cooling the condensing fins to a temperature lower than the baffle fins; said baffle fins and condensing fins being so arranged that the baffle fin shields the condensing fin with which it is associated from radiation normal to the wall member and so that molecules striking a baffle fin and not condensing thereon have a high probability of being directed toward the condensing fin associated with the next adjacent baffle fin.

11. A cryogenic member comprising a wall member, a plurality of substantially planar baffle fins thermally connected to one side of said wall member and being disposed at an angle of substantially 45° with respect thereto, said baffle fins being substantially parallel to one another and substantially uniformly spaced, the wall member and baffle fins visible from said one side having a high emissivity, a plurality of substantially planar condensing fins, a condensing fin being mounted between a baffle fin and the wall member in such manner that the baffle fin shields the condensing fin from radiation normal to said one side of said wall member, and conduit means for circulating nitrogen therethrough for cooling the wall member and the baffle fins, and conduit means for circulating helium therethrough for cooling the condensing fins to a temperature lower than the temperature of the baffle fins.

12. In combination, a chamber adapted for evacuation; pumping means connected thereto to effect such evacuation; a portion of the interior of the chamber constituting a test station; wall means mounted within the chamber, thermally insulated from said chamber, and substantially enclosing the test station; condensing means fixedly mounted with respect to said wall means, thermally insulated therefrom, and encircling the test station; baffle means mounted to substantially shield said condensing means from direct radiation originating from within the test station and to permit molecules of gases from sources within the test station to reach the condensing means; said baffle means being thermally insulated from said condensing means; means for cooling said wall means and baffle means to within a first temperature range; and means for cooling the condensing means to within a second temperature range lower than said first temperature range.

13. In the combination of claim 12 in which the first temperature range is from approximately 77° K. to approximately 100° K. and the second temperature range is in the range of approximately 20° K.

References Cited in the file of this patent
UNITED STATES PATENTS

| | | |
|---|---|---|
| 2,425,714 | Baer | Aug. 19, 1947 |
| 2,453,946 | Sulfrian | Nov. 16, 1948 |
| 2,784,560 | Johnson | Mar. 12, 1957 |
| 2,831,549 | Alpert | Apr. 23, 1958 |
| 2,939,316 | Beecher et al. | June 7, 1960 |
| 2,947,152 | Bloem | Aug. 2, 1960 |
| 2,966,341 | Reder | Dec. 27, 1960 |
| 2,985,356 | Beecher | May 23, 1961 |
| 3,010,220 | Schueller | Nov. 28, 1961 |

OTHER REFERENCES

"1958 Vacuum Symposium Transactions," (American Vacuum Society, Incorporated), published by Pergamon Press, Incorporated, New York, 1959, pages 140–143 of interest.

"1959 Vacuum Symposium Transactions," (American Vacuum Society, Incorporated), published by Pergamon Press, Incorporated, New York, 1960, pages 129–133 of interest.